United States Patent [19]
Payne

[11] Patent Number: 5,256,171
[45] Date of Patent: Oct. 26, 1993

[54] SLUG FLOW MITIGTION FOR PRODUCTION WELL FLUID GATHERING SYSTEM

[75] Inventor: Richard L. Payne, McKinney, Tex.

[73] Assignee: Atlantic Richfield Company, Los Angeles, Calif.

[21] Appl. No.: 941,615

[22] Filed: Sep. 8, 1992

[51] Int. Cl.$^5$ ............................................. B01D 19/00
[52] U.S. Cl. ........................................ 95/19; 95/22; 95/24; 95/260; 95/261; 96/157; 96/174; 96/209; 96/212
[58] Field of Search ................ 55/18, 41, 52, 167–169, 55/204, 219

[56] References Cited

U.S. PATENT DOCUMENTS

| | | | |
|---|---|---|---|
| 2,773,556 | 12/1956 | Meyers et al. | 55/219 X |
| 3,246,451 | 4/1966 | Glasgow | 55/168 X |
| 3,765,442 | 10/1973 | Nettles et al. | 55/167 X |
| 4,160,652 | 7/1979 | Martin et al. | 55/170 X |
| 4,187,088 | 2/1980 | Hodgson | 55/169 |
| 4,424,068 | 1/1984 | McMillian | 55/52 X |
| 4,427,420 | 1/1984 | Reid | 55/18 |
| 4,708,793 | 11/1987 | Cathriner et al. | 210/188 |
| 4,737,168 | 4/1988 | Heath | 55/52 X |
| 4,852,395 | 8/1989 | Kolpak | 73/61.1 |
| 5,082,556 | 1/1992 | Reese | 55/167 X |
| 5,149,344 | 9/1992 | Macy | 55/167 |

FOREIGN PATENT DOCUMENTS 1346184 10/1987 U.S.S.R. ................................... 55/18

OTHER PUBLICATIONS

"Application of Subsea Separation and Pumping to Marginal and Deepwater Field Developments", A. C. Baker, et al, Society of Petroleum Engineers, Inc. 1990, Paper No. SPE 20698.

Primary Examiner—Robert Spitzer
Attorney, Agent, or Firm—Michael E. Martin

[57] ABSTRACT

Oil and gas well production flow is gathered in field common line manifolds and conducted through a separator to make a coarse separation of gas from liquid and minimize slug flow in the conduits leading from the manifolds to further separation, treatment and pumping facilities. A liquid level signal transmitter provides a signal to a valve controller which controls separate liquid and gas discharge flow control valves or a variable speed pump to maintain a set point level of liquid in the separator. Liquid level control is accomplished automatically by varying the flow from the fluid discharge conduit which is connected to the lower pressure flow line, which is usually the gas flow line. Manifold pressures may be sensed to prevent exceeding a predetermined pressure in the manifolds and the well flow lines.

13 Claims, 4 Drawing Sheets

SLUG FLOW MITIGTION FOR PRODUCTION WELL FLUID GATHERING SYSTEM

BACKGROUND OF THE INVENTION

Field of the Invention

The present invention pertains to a two-phase slug flow reduction separator and control system and method for reducing liquid slug flow in hydrocarbon production well fluid gathering and transport systems.

Background

In the production of oil and gas from subterranean wells, a long-standing problem is that of dealing with two-phase flow (gas and liquid) of the produced fluid which may vary considerably during the production life of a well. Normally, in the early phases of production of fluids from a subterranean formation there may be relatively little two phase flow or, more likely, in an oilfield, the gas to liquid ratio is low and/or the fluid flow velocities may be such as to not result in so-called "slug" flow. Later in the life of an oil bearing formation there may be substantial production of gas or water along with hydrocarbon liquids, particularly if gas or water is being used as a drive mechanism to force oil to the production wells. This two-phase flow often results in slug flow wherein "slugs" of liquid will flow through the conduits leading to the separation, treatment and pumping equipment. Accordingly, the separation, treating and pumping equipment must be sized to accommodate the slugs which often results in unwanted increased cost for these facilities.

Slug flow can be mitigated by certain devices such as that described in U.S. Pat. No. 4,708,793 issued Nov. 24, 1987 to R. L. Cathriner, et al. and assigned to the assignee of the present invention. However, certain so-called "slug catchers" interposed in well gathering and production systems must be sized to accommodate the maximum slug flow, which is difficult to predict, and also increases the cost of the gathering system. Certain other problems are associated with slug flow in two phase gathering and transport pipe systems. The turbulence at the slug front is often responsible for limiting the effectiveness of certain additives such as corrosion inhibitors injected into the fluid flow stream. The presence of slug flow minimizes residence time in certain gathering and separating systems and the mechanical vibration induced by slug flow in various flow lines may result in severe structural damage to piping and vessels.

Prior art efforts directed to dealing with two-phase fluid slug flow have been based primarily on the prediction of slug flow and the installation of slug catchers. This is based on the assumption that slug flow becomes manageable if it is known how many and what size slugs will occur over a period of time. What is needed is to develop economic means by which slug flow either does not occur or the slugs are substantially mitigated or reduced to the point that they are not damaging in the various ways indicated above.

A publication entitled "Application of Subsea Separation and Pumping to Marginal and Deep Water Field Developments", A. C. Baker, et al, Society of Petroleum Engineers, Inc. 1990 (SPE 20698), describes an offshore gas-liquid separation system characterized by a subsea well which includes a separation means for effecting gas in liquid separation and a pump for pumping the liquid phase out of the well into a distribution line. Such a system does, of course, require a substantial capital investment in the drilling and completion of the subsea well and related equipment.

The present invention pertains to a slug reduction or mitigation system particularly adapted for installation at onshore, as well as offshore, production well field gathering, or so-called "drill sites" where several production fluid conduits are gathered from individual wells and connected to manifolds or plural flow lines for conducting the well production flow to pumps, compressors or additional separation and treatment equipment.

SUMMARY OF THE INVENTION

The present invention provides a unique slug flow reduction or mitigation arrangement for the fluid gathering and distribution systems of oil and gas wells, in particular.

In accordance with an important aspect of the present invention, oil and gas production well fluid transport conduits or lines which collect fluid production from one or several wells, sometimes known as "common" lines, are provided with a gas/liquid separator interposed therein in such a way that the flow from these lines is diverted to the separator for at least coarse separation of liquid and gas. The output flow from the separator includes a gas flow stream normally having 1% to 5% liquid entrained therein and a liquid flowstream is discharged from the separator normally having 10% to 15% gas entrained therein. The invention provide a unique system and method for making a liquid-gas separation such that the fluid flow downstream of the system is not in the slug flow regime.

In accordance with another aspect of the present invention, there is provided an improved slug flow reduction or mitigation system which includes a separator particularly adapted for separating liquid from gas while permitting substantially continuous liquid flow from the separator to keep solids such as formation sands and the like entrained therein for eventual separation by other facilities. The system permits both gas and separated liquid to be injected back into the major distribution lines for distribution to compressors, pumps or additional separating or treating equipment.

By using the slug flow reduction system of the present invention, the sizing of additional equipment can be carried out without the need to accommodate large cyclical slug flow rates. The configuration of the separator vessel is particularly advantageous for coarse gas-liquid separation while minimizing solids separation and settling. The system is relatively small and may require the use of only one system at a particular drill or fluid gathering site, since the system may include a separator vessel which is normally about one half the size of well test separator systems usually found at drill site fluid gathering and distribution manifolds.

The slug flow reduction system of the present invention also utilizes a control method which operates to maintain a predetermined level of liquid in a separator vessel by controlling the flow of gas and liquid from the separator through separate valves and wherein the fluid discharge conduit (liquid or gas) experiencing the lower back pressure is automatically controlled by a valve to maintain the predetermined liquid level without complex sensing and control functions, even when flow rates and gas to liquid ratios are changing. The control method also does not require measurement of the fluid discharge line pressures to determine which conduit is experiencing the lower pressure. Still further according to the invention, the system operates in such a way that the needed slug flow reduction is provided while not increasing the system back pressure which is seen at the drill site common lines or manifolds and the wells connected thereto. The system and method of the present invention may be implemented in existing liquid gathering and distribution systems as well as newly installed systems.

Those skilled in the art will further appreciate the above-noted features and advantages of the present invention together with other superior aspects thereof upon reading the detailed description which follows in conjunction with the drawing.

DESCRIPTION OF PREFERRED EMBODIMENTS

Figure 1:
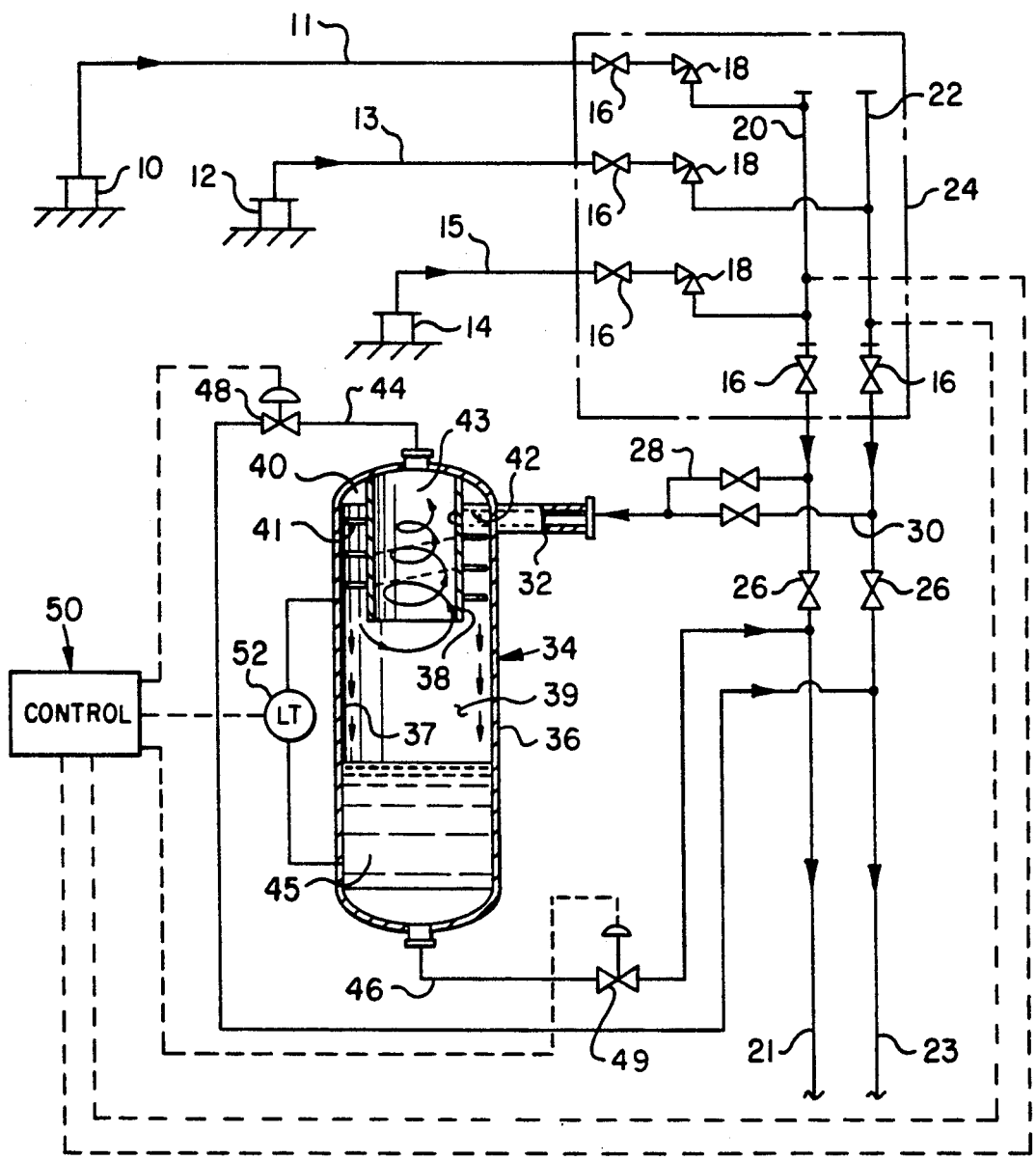
FIG. 1 is a schematic diagram of the slug flow reduction arrangement or system interconnected in a multiple well fluid gathering and distribution system.

The drawing figures are not necessarily to scale and represent one example of a slug flow mitigation arrangement for reducing liquid slugs in the collecting lines or manifolds for a multiple well fluid gathering system, sometime referred to as a "drill site".

Figure 2:
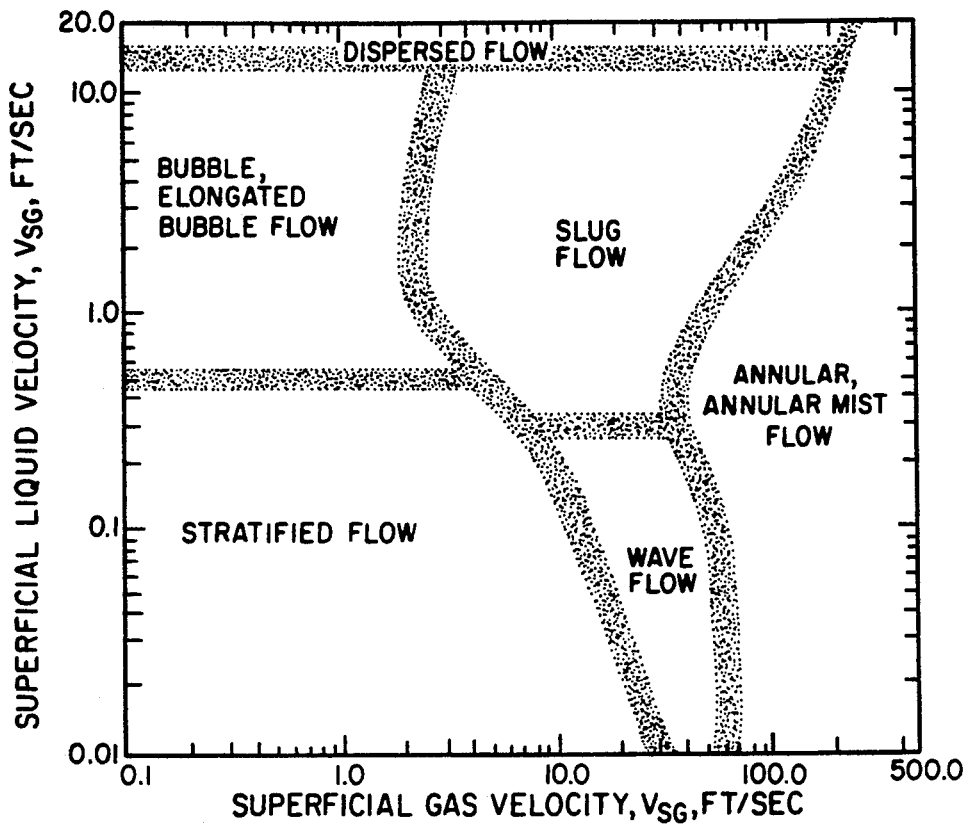
FIG. 2 is a diagram indicating flow conditions of two-phase flow as a function of both gas and liquid velocity.

Referring briefly to FIG. 2, there is illustrated the various flow regimes that are experienced in two-phase (gas and liquid) flow through conduits as a function of gas velocity and liquid velocity, respectively. As previously mentioned, the flow regime that is most often desired to be avoided is slug flow indicated from the diagram. If a sufficient separation can be accomplished, the flow regime for liquid will likely settle into the area indicated as bubble flow and the condition experienced by the gas stream will likely fall into the regime entitled "annular mist flow". Accordingly, a separation process as far upstream as possible in a fluid transport system is desirable to produce no more than bubble flow and annular mist flow in their respective separated fluid lines and to thus avoid the slug flow regime.

Referring now to FIG. 1, there is shown by way of example, a plurality of wells 10, 12 and 14 which are adapted to produce hydrocarbon fluids from a subterranean reservoir, not shown. The wells 10, 12 and 14 are likely to produce two phase fluid flow (gas and liquid) which may be unsteady and the proportions of the phases may change from time to time. In accordance with prior art practice, this anticipated condition would necessitate the sizing of fluid handling and treatment facilities to accommodate intermittent slugs of liquid and gas, which usually develop to greater proportions in the fluid "common" lines, as opposed to a substantially steady flow of each. Also in accordance with prior art practice, it might be considered necessary to install a slug catcher similar to that described in U.S. Pat. No. 4,708,793.

The wells 10, 12 and 14 each have a production fluid flow line 11, 13, and 15, respectively, which include suitable emergency shutdown valves 16 interposed therein together with flow control valves or chokes 18. Depending on the flow line pressure, the well production flow lines are connected to one or more so-called common lines such as the conduit or manifold 20 which receives flow from the wells 10 and 14 and a second common line or manifold 22 which receives the flow from well 12. In accordance with the number of wells and the operating conditions of each well, the so-called common lines 20 and 22 may be set to operate at different pressures. Moreover, these lines typically conduct the fluids they receive to suitable treatment facilities, not shown, and which may include slug catchers of the type described in the aforementioned patent. After treatment or separation of gas from liquid, the gas would be conducted to a suitable compressor, not shown, and the liquid would be transferred to pumps, not shown, for transport through a pipeline to a predetermined destination. The common lines 20 and 22 also have suitable emergency shut down valves 16 interposed therein. The chokes 18 together with the common lines or manifolds 20 and 22 may be disposed in an enclosure 24 or supported on a suitable pad in the oil or gas field in the vicinity of the wells 10, 12 and 14. The manifolds 20 and 22 are connected to respective flow lines 21 and 23 which lead to the aforementioned treatment or slug catching facilities from which suitable conduits, not shown, then lead to compressors, pumps or suitable storage facilities.

In accordance with the present invention, a drill site manifold arrangement such as that shown within the enclosure 24 may be originally designed or modified to include shut off valves 26 interposed in the respective flow lines 21 and 23. Suitable conduits 28 and 30 are connected to the flow lines 21 and 23, as shown in FIG. 1, and are interconnected to conduct flow from both of the manifolds 20 and 22 to the inlet conduit 32 of a unique centrifugal type separator, generally designated by the numeral 34. The separator 34 may be of the type described in U.S. Pat. No. 4,852,395 issued on Aug. 1, 1989, to Miroslav M. Kolpak and assigned to the assignee of the present invention.

The separator 34 includes a generally cylindrical closed vessel 36 in which there is disposed a cylindrical depending shroud 38. A spiral flow passage 40 is formed by a baffle plate 41 extending between the shroud 38 and the sidewall 37 of the vessel 36 and is in communication with a tangential inlet opening 42 of the inlet conduit 32. In this way, two phase fluid flow entering the separator vessel 34 is forced to flow in a spiral path to substantially separate gas from liquid and, upon exiting the spiral flow passage defined by the baffle 40 into the chamber 39, liquid falls into the vessel and gas circulates within and exits the chamber 39 through a secondary chamber 43.

A gas outlet conduit 44 is connected to the vessel 36 for receiving gas from the chamber 43 and a liquid outlet conduit 46 is disposed at the bottom of the vessel to receive liquid flow. The separator 34 may be sized to accommodate the slug flow from the wells 10, 12 and 14 and is required to be significantly less structure than would be required to exist if the aforementioned fluid treatment facilities were sized to accommodate so-called slug flow or to achieve substantially complete gas-liquid separation. The separator 34 is adapted to perform a relatively coarse gas-liquid separation process wherein gas flow leaving the chamber 39, 43 through the conduit 44 may have up to a maximum of about 5% liquid entrained therein, by volume. Conversely, liquid 45 residing in the interior of the vessel 36 may be injected into the flow line 21 by way of the conduit 46 and contain up to 15% gas by volume. For a gathering system which is sized to produce about 1.1 million cubic feet per day of liquid, the separator 34 should have a volumetric capacity of the vessel 36 of approximately 730 cubic feet, considering that gas flow volume from the wells, in total, does not exceed about 13.6 million cubic feet per day.

The gas output line 44 is suitably connected to the flow line 23 downstream of the valve 26 in the direction of flow of fluid through the flow line indicated by the arrows. In like manner, the liquid outlet conduit 46 is connected to the flow line 21 downstream of its shut off valve 26. The outlet conduits 44 and 46 each have suitable flow control means interposed therein comprising motor operated flow control valves 48 and 49, respectively. The motor operated valves 48 and 49 are operably connected to a controller, generally designated by the numeral 50, for operating the valves to control the flow of gas and liquid, respectively, from the separator 34 to the flow lines 23 and 21.

The separator 34 is also provided with a liquid level sensor and signal transmitter 52 which may be of a float type. One type of liquid level transmitter which is suitable for use with the separator 34 is a 2500 Series manufactured by Fisher Controls International, Inc. of Marshalltown, Iowa. The transmitter 52 is adapted to provide an output signal indicating the level of liquid 45 in the separator vessel 36, which output signal is conducted to the valve controller 50. The valve controller 50 may include a proportional integral derivative (PID) type control function which receives a variable signal from the level transmitter 52 and provides signals to the valves 48 and 49 to control the level of liquid to maintain a set point or predetermined level.

Figure 4:
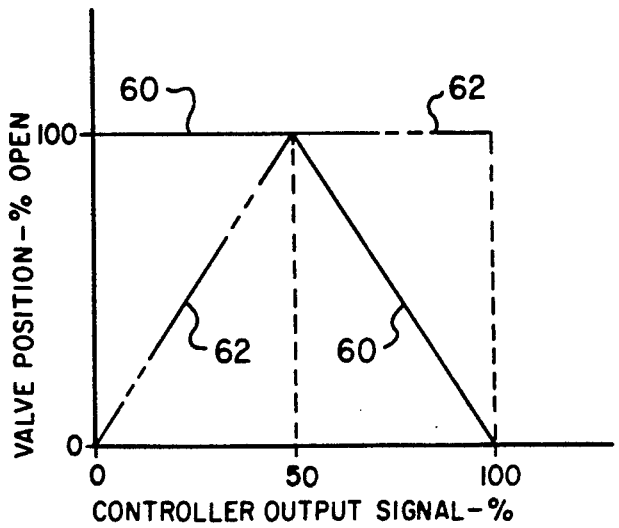
FIG. 4 is a diagram showing the position of the separator liquid and gas outlet valves as a function of the controller output signal.

Referring now also to FIG. 4, there is illustrated one preferred method for operating the slug mitigation arrangement described above and shown in FIG. 1. FIG. 4 illustrates in diagrammatic form the positions of the respective control valves 48 and 49 as a percent of their wide open positions, respectively, versus the output signal of the controller 50 to the valves 48 and 49, as a percent of the maximum signal. The solid line 60 in FIG. 4 indicates the position of the gas flow control valve 48 and the dashed line 62 indicates the position of the valve 49 for controlling the flow of liquid from the vessel 46. As indicated in the diagram, with the preferred method to be described, the position of the valve 49 is controlled between its closed position and its wide open position for a controller output signal less than 50%. Conversely, the gas flow control valve 48 is maintained in a wide open position for a controller output signal less than 50%, and the valve 48 is progressively closed resulting in a tendency for pressure to increase in the chamber 39 to force liquid through the conduit 46. Although the diagram of FIG. 4 indicates complete closure of valves 48 and 49, they actually may only close to about 20%-30% of wide open positions so as to minimize the chance of increasing back pressure in the common lines 20 and 22. Also, the controller 50 may control the valves 48 and 49 in response to pressure limit control signals from the lines 20 and 22.

Figure 3:
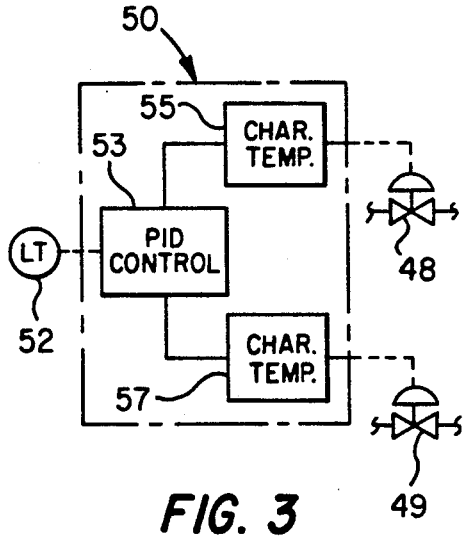
FIG. 3 is a brief diagram of the control functions of the controller for controlling the separator outlet valves.

FIG. 3 illustrates a simplified schematic diagram of the control functions of the controller 50. The signal from the level sensor 52 is subjected to analysis by a proportional integral derivative control program 53 which produces a controller output signal from 0 to 100 percent based on the variation of the level of the liquid in the vessel 36 from a set point or predetermined desired level. The controller output signal is then subjected to treatment by separate programs comprising characterization templates 55 and 57 which produce signals to the operators of the valves 48 and 49, respectively. The program 53 may also be adapted to respond to rates of change of the level of liquid in the vessel 36 based on the change in signal input to the program 53 from the sensor 52.

Figure 5:
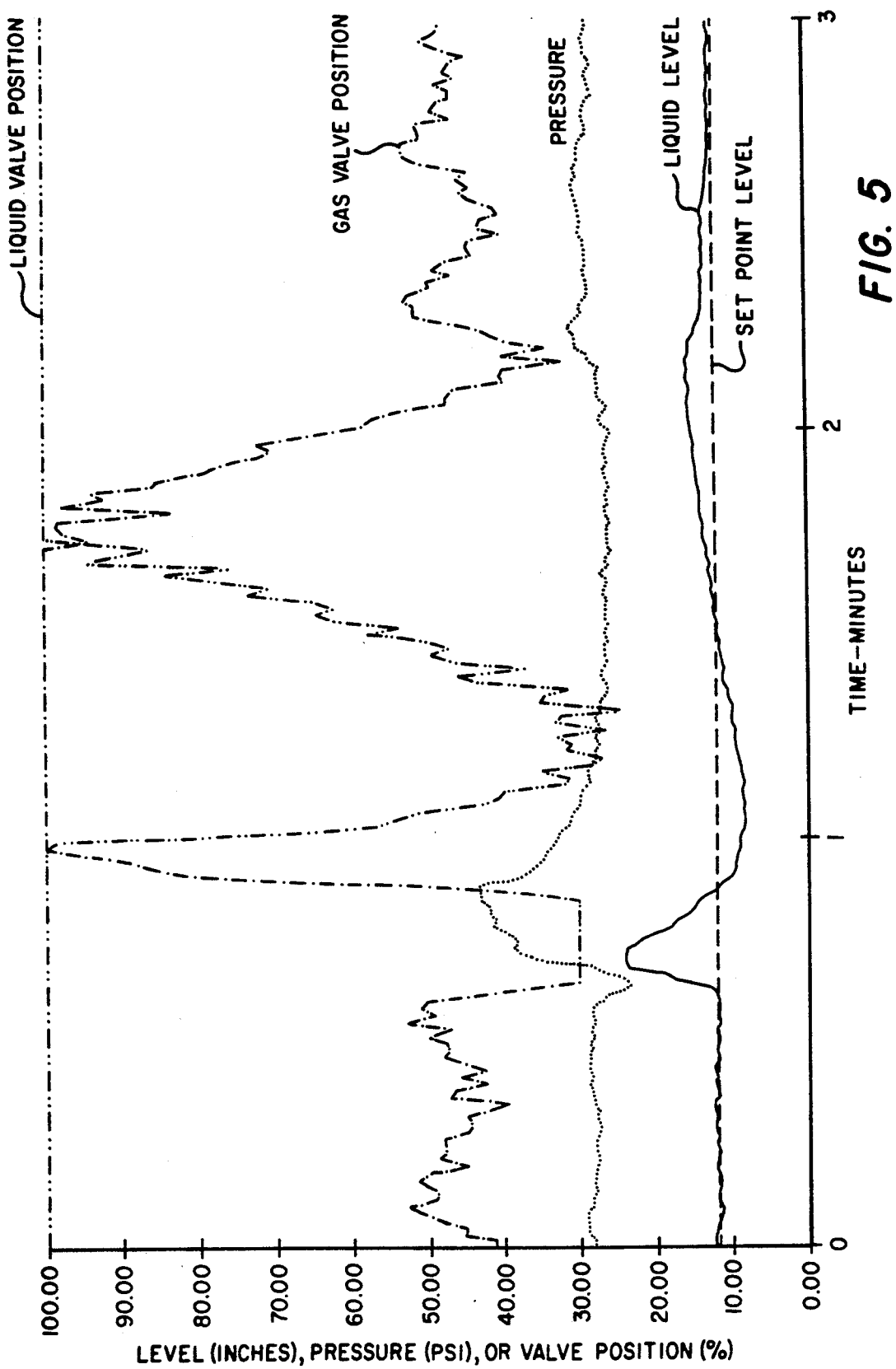
FIG. 5 is a diagram illustrating changes in liquid level, pressure in the separator vessel and valve position as a function of time.

Referring briefly to FIG. 5, there is illustrated the operating characteristics of the valves 48 and 49 for a typical operating condition of a system as illustrated in FIG. 1. In FIG. 5, separate lines indicate the position of the liquid control valve 49 as a percent of its wide open position, the position of the gas control valve 48 as a percent of its wide open position, the pressure in the separator vessel 34 and the liquid level in the chamber 39. The set point level is also indicated by a horizontal line. At a time of about 40 seconds from the starting condition, a slug of liquid has entered the vessel 34 as indicated by the sharp rise in liquid level from about 12 inches to about 24 inches. This rapid change in liquid level is also accompanied by a rapid reaction of the position of the valve 48 to move from a position of about 50% open to a controller set position of about 30% open which results in a pressure increase in the chamber 39 as indicated. The immediate increase in pressure in the chamber 39 drives the liquid level down below the set point which results in a reaction of the position of the valve 49 to quickly move to a position of about 30% of wide open from a position of 100% open. At the same time the reduced liquid level and the increased pressure causes the valve 48 to move rapidly to a wide open position. After a cycle between full open and substantially closed of the valves 48 and 49 and stabilization of the liquid level, as indicated by only a minor variation from the set point, the liquid flow control valve 49 returns to its wide open position and the gas flow control valve 48 returns to a modulating position between two and three minutes from time zero. A system operating in accordance with the method described thus reacts rapidly to stabilize the liquid level in the vessel 34 near the set point indicated.

The controller 50 may be adapted to sense the fluid pressures in the manifolds 20 and 22. The pressures sensed in the manifolds 20 and 22 may be compared with maximum set points in the controller 50 so that the valves 48 and 49 are not closed enough to substantially increase back pressure in the manifolds and thereby increase back pressure on the production flow lines of the wells 10, 12 and 14.

In another method according to the present invention, fluid flow from the vessel 36 may be controlled by modulating or positioning the valves 48 or 49 in accordance with which of the flow lines 21 and 23 indicates the lower back pressure. For example, if the gas flow line 23 indicates that it is operating at the lower of the pressures in the lines 21 and 23, respectively, and a sufficient amount of liquid is flowing into the vessel 36, the valve 49 may be held wide open and the valve 48 modulated to maintain a liquid level which will provide a controller output signal between 50% and 100% of its maximum. Of course, if the liquid level falls to a condition which produces a controller output signal below 50% of maximum, the valves 48 and 49 may be adjusted to reduce liquid flow out of the vessel 36 to prevent complete evacuation of the vessel and possibly injection of gas through the outlet conduit 46 and into the flow line 21.

Figure 6:
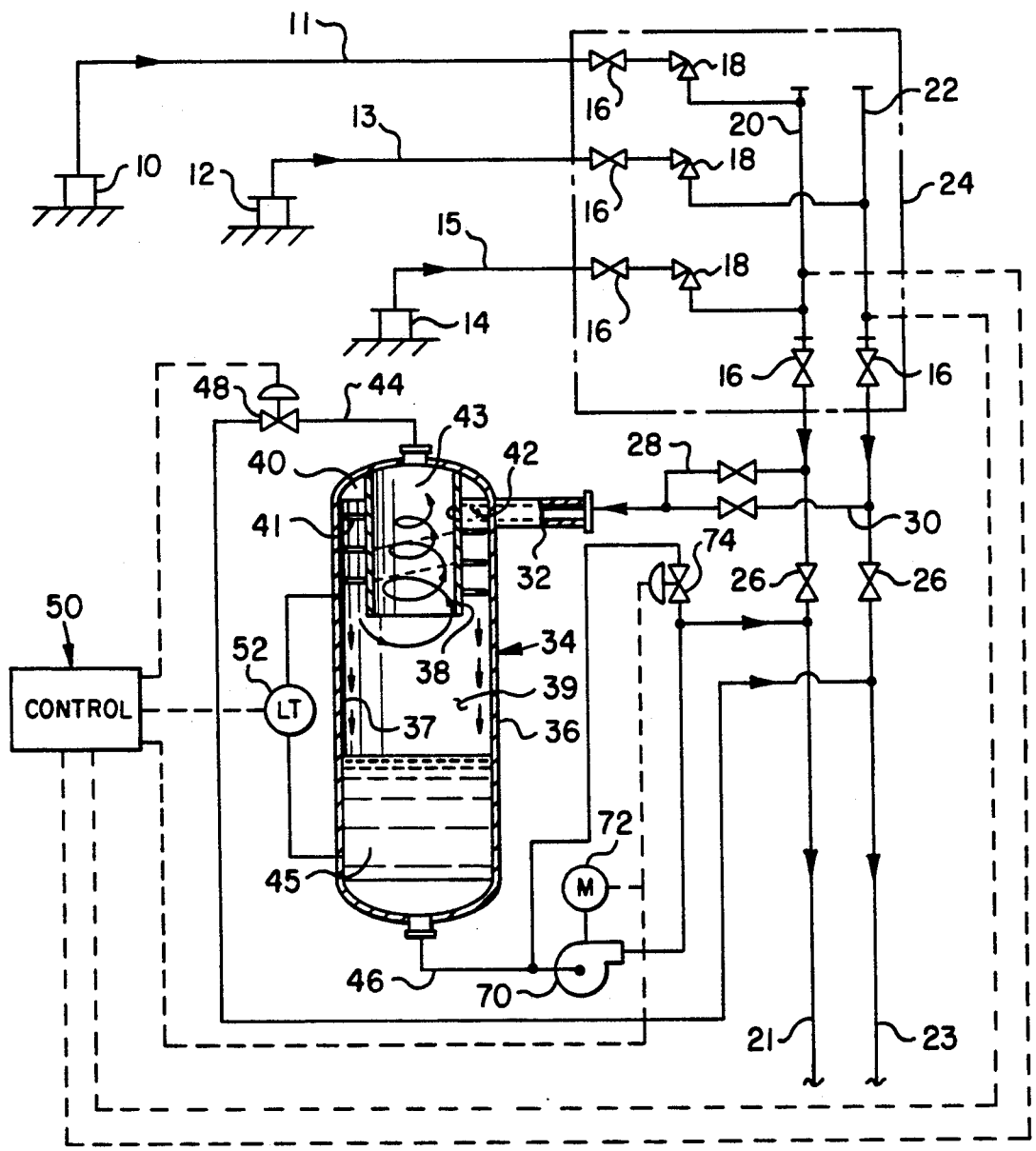
FIG. 6 is a diagram illustrating a first alternate embodiment of a slug flow reduction arrangement according to the present invention.

Referring now to FIG. 6, there is illustrated an alternate embodiment of a system in accordance with the present invention. The system illustrated in FIG. 6 is substantially similar to the system illustrated in FIGS. 1 and 3, except that the valve 49 in the liquid discharge conduit 46 is replaced by a variable speed pump 70 driven by a suitable motor 72 which may be controlled by the controller 50 to vary the speed of the pump 70 to control the level of liquid in the separator 34. The control signal for controlling the speed of the motor 72 may also be applied to a bypass valve 74 working in concert with the motor 72 or independently of the motor to recirculate a portion of the liquid discharge flow from the conduit 46 back into the conduit, as shown, or into separator space 39, if liquid is drawn down in the space 39 beyond a set point. Accordingly, liquid discharge flow control means comprising the pump 70 may receive a control signal from the characterization template 57 so that, for example, when the controller output signal is between zero and fifty percent of its maximum, the liquid level in the space 39 is controlled by varying the speed of the pump 70 instead of controlling the position of the valve 49 in the system of FIG. 1.

The slug flow reduction or mitigation arrangement described and illustrated is believed to be advantageous for retrofitting existing production well gathering and distribution systems as well as for installation into a new facility. It is contemplated that the arrangement illustrated and described may be used in other systems wherein fluid slug flow is present although the conditions which exist in producing fluids from plural wells from subterranean reservoirs presents, perhaps, the most useful application of the slug flow mitigation system or arrangement. Operation of the slug flow reduction system described above is believed to be readily understandable from the description of the system and its operating characteristics. The components of the system may be constructed using conventional materials for pressure vessels, flow conduits and valves used in production and distribution of hydrocarbon fluids. The control components including the level transmitter 52 and the controller 50 may also be obtained commercially and the controller programmed in accordance with the operating parameters and method described herein.

Although preferred embodiments of the invention have been described in detail, those skilled in the art will recognize that various substitutions and modifications may be made without departing from the scope and spirit of the recitation appearing in the appended claims.

What is claimed is:

1. A method for reducing slug flow from a flowline conducting multiphase fluid flow from one or more production wells, said methods comprising the steps of:
conducting said multiphase fluid flow through separator means including means for separating gas from liquid therein, said separator means including a multiphase fluid inlet conduit, a gas discharge conduit and a liquid discharge conduit, flow control means interposed in said discharge conduits, respectively, and fluid transport conduit means connected to said discharge conduits;
sensing the level of liquid in said separator means during flow of fluid to said separator means and providing a liquid level control signal which varies with a change in liquid level from a set point; and
maintaining a predetermined level of liquid in said separator means and mitigating slug flow of fluid through said transport conduit means by controlling the flow of said fluids comprising gas and liquid discharged from said separator means with said flow control means.

2. The method set forth in claim 1 including the step of:
providing said control signal to have a magnitude which varies between a minimum and a maximum signal value in relation to change in the liquid level in said separator means from said set point.

3. The method set forth in claim 2 wherein:
the step of controlling the flow of one of said fluids comprises controlling the flow of gas from said separator means when said control signal is greater than about 50% of the maximum signal value.

4. The method set forth in claim 2 wherein:
the step of controlling the flow of one of said fluids comprises controlling the flow of liquid from said separator means when said control signal is less than about 50% of the maximum signal value.

5. The method set forth in claim 2 including the step of:
controlling the flow of at least one of gas and liquid from said separator means in accordance with the pressure in said flowline.

6. A method for reducing slug flow from plural flow lines conducting multiphase fluid flow from plural production wells, said plural flow lines being connected to respective manifold means for receiving multiphase fluid flow from said wells, said method comprising the steps of:
placing closure valve means in said flow lines;
providing a separator vessel including means for separating gas from liquid therein, said separator vessel including an inlet conduit, a gas discharge conduit and a liquid discharge conduit;
connecting said inlet conduit to said flow lines on an upstream side of said closure means with respect to the direction of flow of fluid through said flow lines;
connecting said gas discharge conduit to one of said flow lines downstream of said closure means in the direction of flow of fluid through said one flow line;
connecting said liquid discharge conduit to the other of said flow lines downstream of said closure means with respect to the direction of flow of fluid through said other flow line;
sensing the level of liquid in said separator vessel during flow of fluid from said manifold means to said separator vessel; and
controlling the flow of at least one of said fluids comprising gas and liquid discharged from said separator vessel to maintain a predetermined level of liquid in said separator vessel and to mitigate slug flow of fluid through said flow lines.

7. In a produced fluid gathering and distribution system for a plurality of fluid producing wells, said gathering and distribution system including at least two common manifolds and flow lines connected thereto for collecting two-phase fluid flow from said plurality of wells and for conducting said two phase fluid flow to at least one of fluid treatment facilities and pump means for pumping both liquid and gas produced from said wells, the improvement characterized by:

a slug flow reduction arrangement for reducing substantially the slug flow of liquid and/or gas from said manifolds comprising a separator vessel operatively interposed between said manifolds and said flow lines including an inlet conduit connected to both of said manifolds for receiving fluid therefrom, means in said separator vessel for separating gas and liquid whereby separated gas and liquid contain less than about 5% and 15% of the other phase of fluid leaving said separator vessel, respectively, a gas discharge conduit connected to said separator vessel and to one of said flow lines for conducting gas to said one flow line, a liquid discharge conduit connected to said separator vessel and to another of said flow lines for conducting liquid to said another flow line;

a control valve interposed in said gas discharge conduit;

flow control means interposed in said liquid discharge conduit; and a liquid level signal transmitter associated with said separator vessel for sensing the level of liquid in said separator vessel and for providing a signal indicating said liquid level for effecting operation of said control valve and said flow control means to control the flow of liquid from said separator vessel.

8. The improvement set forth in claim 7 wherein:
said flow control means comprises a control valve in said liquid discharge conduit.

9. The improvement set forth in claim 8, including:
a controller for receiving said signal from said transmitter and for sending control signals to respective ones of said control valves for causing one of said control valves to be in a substantially open position while the other of said control valves is modulated to control the liquid level in said vessel.

10. The improvement set forth in claim 7 wherein:
said flow lines have closures interposed therein to separate a portion of said flow lines having conduit means connected thereto, respectively, and to said inlet conduit of said separator from portions of said flow lines which have said gas discharge conduit and said liquid discharge conduit connected thereto, respectively.

11. The improvement set forth in claim 7 wherein:
said flow control means comprises a pump and said system includes a controller for receiving said signal from said transmitter and for controlling the liquid discharge flow of said pump and the gas flow through said control valve in response to variation in liquid level in said vessel from a predetermined set point.

12. The improvement set forth in claim 11 including:
a bypass valve for controlling liquid flow from said pump to said separator.

13. In a produced fluid distribution system for at least one fluid producing well, said distribution system including flow lines for collecting two-phase fluid flow from said well and for conducting said two phase fluid flow to at least one of fluid treatment facilities and pump means for pumping both liquid and gas produced from said well, the improvement characterized by:

a slug flow reduction arrangement for reducing substantially the slug flow of liquid and/or gas from said well comprising a separator vessel operatively interposed in said flow lines including an inlet conduit connected to at least one of said flow lines for receiving fluid therefrom, means in said separator vessel for separating gas and liquid whereby separated gas and liquid contain approximately less than 5% and 15% of the other phase of fluid leaving said separator vessel, respectively, a gas discharge conduit connected to said separator vessel and to one of said flow lines for conducting gas to said one flow line, a liquid discharge conduit connected to said separator vessel and to another of said flow lines for conducting liquid to said another flow line;

a control valve interposed in said gas discharge conduit;

a control valve interposed in said liquid discharge conduit;

a liquid level signal transmitter associated with said separator vessel for sensing the level of liquid in said separator vessel and for providing a level signal indicating said liquid level for effecting operation of said control valves to cause said liquid level to move toward a predetermined level position in said separator vessel; and a controller for receiving said level signal from said transmitter and for sending control signals to respective ones of said control valves for causing said control valves to be in respective positions to control the liquid level in said separator vessel.

* * * * *